No. 731,821. PATENTED JUNE 23, 1903.
C. T. THOMPSON.
GOLF BALL.
APPLICATION FILED FEB. 5, 1902.
NO MODEL.

WITNESSES:
Arthur E. Paige
James H. Bell

INVENTOR:
Claves T. Thompson
by his attorneys
Emery + Paul

No. 731,821.

Patented June 23, 1903.

UNITED STATES PATENT OFFICE.

CHARLES T. THOMPSON, OF PHILADELPHIA, PENNSYLVANIA.

GOLF-BALL.

SPECIFICATION forming part of Letters Patent No. 731,821, dated June 23, 1903.

Application filed February 5, 1902. Serial No. 92,613. (No model.)

*To all whom it may concern:*

Be it known that I, CHARLES T. THOMPSON, a citizen of the United States, residing at No. 2116 Spruce street, in the city and county of Philadelphia and State of Pennsylvania, have invented certain new and useful Improvements in Golf-Balls, of which the following is a specification, reference being had to the accompanying drawings.

My invention relates to the manufacture of balls for playing golf or similar games; and it consists in making the ball out of a combination of vulcanized rubber and feathers, as hereinafter described.

Figure 1:
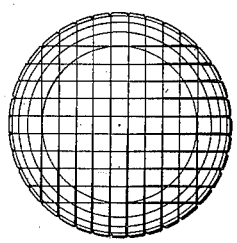
Figure 2:
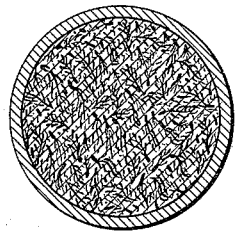
Figure 3:
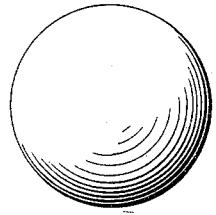

In the accompanying drawings, Figure 1 is a perspective view of the ball. Fig. 2 is a sectional view. Fig. 3 is an interior view of the ball prior to the application of the gutta-percha cover.

To manufacture a golf-ball for the purposes of my invention, a sufficient quantity of rubber is dissolved in benzin or other solvent and powdered sulfur is added thereto. With the viscous liquid thus formed a quantity of feathers is mixed. The feathers are first cleaned by soaking in benzin. The mixture is allowed to evaporate until it is thoroughly cohesive. The material is then subjected to pressure between two hemispherical dies and to vulcanizing heat while under the pressure, and thereby formed into a hard ball, as shown at A, Fig. 3. To the outer surface of the ball thus formed a covering of gutta-percha or caoutchouc may be applied, as shown at B, Fig. 2, the surface of this covering being scored or molded, as shown in Fig. 1.

While I do not limit myself to the proportions of rubber and feathers used, yet I find that it is desirable to have the feathers make up from one-third to two-thirds of the weight of the mixture. I likewise do not limit myself as to the proportions of rubber and sulfur in the mixture; but I find that a combination of about fifteen parts sulfur to one hundred parts rubber is a desirable one. I also find that it is desirable to add to the materials mentioned about one-third their weight of zinc oxid as a filling. The resultant mass after the pressure has been applied and it has been vulcanized is exceedingly hard and elastic and at the same time exceedingly strong. The feathers interlacing in all directions tie the ball together, so that it forms a hard elastic mass, the elasticity and strength of which are increased by the rubber being vulcanized. In this way I have succeeded in producing balls so hard and compact that if made of the proper size their surface may be molded or scored and the ball used for play without the application of any gutta-percha or other cover; but my invention contemplates the application of the cover as the preferred form of manufacture.

In addition to the strength which the interlacing feathers impart to the ball there is a great saving of cost obtained by using them, as the price of feathers per pound is very much less than the cost of india-rubber. In order that the ball may be weighted as required, a small core of lead or cork may be added in the center, if desired; but usually this is not necessary.

Having thus described my invention, I claim—

1. A golf-ball, composed of rubber combined with feathers, substantially as described.

2. A golf-ball composed of vulcanized rubber combined with feathers, substantially as described.

3. A golf-ball having a center composed of vulcanized rubber combined with feathers and a surrounding gutta-percha shell, substantially as described.

4. A golf-ball having a center composed of vulcanized rubber and zinc oxid combined with feathers, with a surrounding gutta-percha shell, substantially as described.

5. A golf-ball, having a center composed of rubber intimately mingled and united in all its parts by feathers mixed therein, substantially as described.

CHARLES T. THOMPSON.

Witnesses:
  JAMES H. BELL,
  C. BRADFORD FRALEY.